United States Patent

Clausen et al.

| | |
|---|---|
| [11] Patent Number: | 6,110,411 |
| [45] Date of Patent: | Aug. 29, 2000 |

[54] LASER SINTERABLE THERMOPLASTIC POWDER

[76] Inventors: Christian Henning Clausen, P.O. Box 24, Woodbury, N.J. 08096; Daniel James Mickish, 823 Mantico Rd, Wilmington, Del. 19803; William John Nebe, 2719 Tanager Dr., Wilmington, Del. 19808; Shailaja R. Vaidya, 1 Paddock Pl., Hockessin, Del. 19707

[21] Appl. No.: 09/041,318

[22] Filed: Mar. 12, 1998

Related U.S. Application Data

[60] Provisional application No. 60/041,078, Mar. 18, 1997.

[51] Int. Cl.$^7$ ...................................................... H05B 6/00
[52] U.S. Cl. ........................................ 264/497; 156/272.8
[58] Field of Search ........................ 524/430; 156/272.8; 264/497

[56] References Cited

U.S. PATENT DOCUMENTS

| | | | |
|---|---|---|---|
| 3,763,109 | 10/1973 | Witsiepe | 260/75 R |
| 3,946,089 | 3/1976 | Furukawa | 525/420 |
| 4,214,019 | 7/1980 | Donermeyer | 523/218 |
| 4,217,376 | 8/1980 | Donermeyer | 523/218 |
| 4,252,712 | 2/1981 | Donermeyer | 523/218 |
| 4,480,008 | 10/1984 | Farronato | 528/45 |
| 4,944,817 | 7/1990 | Bourell et al. | 156/62.2 |
| 5,156,697 | 10/1992 | Bourell et al. | 156/62.2 |
| 5,260,009 | 11/1993 | Penn | 264/40.1 |
| 5,304,329 | 4/1994 | Dickens, Jr. et al. | 264/25 |
| 5,342,919 | 8/1994 | Dickens, Jr. et al. | 528/323 |
| 5,382,308 | 1/1995 | Bourell et al. | 156/62.2 |
| 5,385,780 | 1/1995 | Lee | 428/325 |

FOREIGN PATENT DOCUMENTS

| | | | |
|---|---|---|---|
| 0 392 285 | 10/1990 | European Pat. Off. | C08G 18/08 |
| 0 399 272 | 11/1990 | European Pat. Off. | C08J 5/18 |
| 0 413 258 | 2/1991 | WIPO | C08L 77/00 |
| WO 96 17003 | 6/1996 | WIPO | C08J 5/18 |

OTHER PUBLICATIONS

Chemical Abstracts, Abstract No. 331279, vol. 125, No. 26, Dec. 23, 1996.
Chemical Abstracts, Abstract No. 31578, vol. 120, No. 4, Jan. 24, 1994.
Patents Abstracts of Japan, vol. 12, No. 110 C–486), Apr. 8, 1998.

*Primary Examiner*—Paul R. Michl
*Attorney, Agent, or Firm*—Pillsbury Madison & Sutro

[57] ABSTRACT

The present invention relates to a laser sinterable thermoplastic powder having a Tg of less than 50° C.

15 Claims, No Drawings

LASER SINTERABLE THERMOPLASTIC POWDER

This application claims benefit of Provisional Application Serial No. 60/041,078 filed Mar. 18, 1997.

The present invention relates to a thermoplastic laser sinterable powder which may be used to form flexible articles at relative low temperatures and a method for forming articles from the thermoplastic powder of the invention.

BACKGROUND OF THE INVENTION

Laser Sintering is a process by which a three dimensional article may be formed in a layer-wise fashion by selectively projecting a laser beam having the desired energy onto a bed of resin particles. Prototype or production parts may be efficiently and economically produced by this process, which is often times referred to as Selective Laser Sintering (SLS, trademark of DTM Corporation, Austin, Tex.). This process has been described in U.S. Pat. Nos. 4,944,817; 5,516,697 and 5,382,308 to Bourell, et al.; 5,304,329 and 5,342,919 to Dickens, Jr. et al. and 5,385,780 to Lee.

Generally selective laser sintering technique and equipment use a laser which emits energy focused on a target area. In the target area, where the part is produced, is a powdered material which partially melts or softens under the energy emitted from the laser. The selective laser sintering equipment includes a means to deposits a smooth, level layer of the powdered material on to the target surface before the layer of powder is exposed to the laser energy. The laser energy emission is controlled and limited to a selected portion of the target area by a computer link to a CAD/CAM system which directs the laser to scan to form a "slice" of the part. After exposure of powdered material to form the first "slice" of the part, a second layer of powdered material is deposited into the target area. Again the laser scans the target area exposing only the portions of the target area as directed by the CAD/CAM program producing a second "slice" of the part. This process is repeated until the part is built up "slice by slice" to form the completed part.

It has been the practice that the laser energy to which the powder is exposed is just that amount that is sufficient to quickly form the part slice, and therefore, it has been necessary to heat the target environment so that the powdered resin is at or very close to its melting point before laser exposure. Thus, the thermal properties of the sinterable powder are important in assuring that there is a window of operation in the selective laser sintering process. That is, so that there is a minimal of polymer particle softening at some elevated temperature so that the powder can remain in the heated target environment with out the initiation of particle fusing until a later time at which a rapid, focused boost in thermal energy is supplied to the heated particles by the scanning laser beam.

There are several techniques known to provide this window of operation for the laser sinterable powdered materials. Generally these techniques rely on the mixing of powders from various materials, especially polymer materials having characteristics that provide a wide range in softening and melting characteristics, and selection of powder particle sizes that provide good packing properties. Widening the softening or melting range provides a powder that can be stored in the target area at a temperature that is close to the fusion point of the particles. The additional energy provided in the laser scan can quickly fuse the particles to form the "slice" of the cross section of the part without causing hot spots that may contribute to poor resolution of the part dimensions.

Providing a particle size distribution of a mix large and small particles or a bimodal particle size distribution not only provides small particles that will heat faster and, thus, fuse easily to form the slice of the part, but also provides smaller particles which may pack in between the interstitial spaces between the larger particles of the powder providing a means of densifying the fused part.

The window of operation has been widened by Buorell, for example, by the inclusion of a plurality of materials, either as a coated particle or as a mixture of particles. The materials in these mixtures have different softening temperatures, which may be widely separated from the other. The mix of such powdered materials produces a bulk powder that contains only a small amount of readily melting material. This same idea of differentiation of the softening or melting point of the polymer to provide a window of operation was illustrated in Dickens, et al. by not only including a bimodal particle size distribution, but also by using a semicrystalline polymer that has some amorphous character that possesses a softening point below the caking (fusion) temperature of the crystalline material.

Lee taught the use of a fairly high concentration of an anticaking material incorporated into the powdered polymer particle surface to preclude polymer particles from sticking together at an initial Tg (glass transition temperature) of the polymeric material. With the additional thermal energy provided by the laser exposure, the powdered polymer particles reached a second Tg, and the separate particles then melted or soften to the extent that they bonded to other such softened polymer particles forming a fused layer or "slice" of the part.

But in each of these techniques, the temperature in the target zone had to be relatively high, sometimes as much as 190° C. The polymer particles, after laser exposure, became super heated and the parts formed had to be cooled for long periods of time before they could be removed from the bed of powdered resin. With the elevated temperatures required for maintaining the powdered polymer near the softening point, temperature control becomes difficult, and temperature variations are common. Temperature variations in the target area contributes to distortion, poor parts quality and to higher costs of operation.

In addition, parts made from prior art polymers had poor flexibility. The lower temperature softening and melting material acted like a glue to stick particles into ridged shapes. The high content of inflexible inorganic materials such as anticaking materials, or materials having very high melting points, functioned as reinforcement of the fused layer.

It is the object of the present invention to provide a polymer powder that can be easily sintered into flexible shapes at lower temperatures. The lower operating bed temperatures of the sinterable powders of the present invention provide greater temperature control, lower distortion of the objects formed therefrom as compared to the powders of the prior art.

It is also an object of the present invention that the part or article, after formation by sintering, be removed from the bed of sinterable powder particles immediately without having to wait for the article or part to cool slowly in the heated resin bed. A slow cool down step has been required to avoid stress and stress cracking that may develop when the part is cooled to room temperature too rapidly. Parts sintered from the powder of the present invention may be removed immediately from the bed of resin after formation or at any time during the formation process after a pass of the laser is complete. Removal from the resin bed immediately after a pass of the laser is complete will change the temperature of the part rapidly to room temperature, but does not cause stress to develop or stress cracking in parts formed from the powdered resin of the present invention. This property enhances the usefulness of the powdered resin of the present invention and avoids loss time between forming one set of parts and then forming a second set of parts, thus decreasing the cycle time of the laser sintering operation.

It is also an object of the present invention to provide a sinterable powdered resin that has a wide range of operation latitude. That is to provide a sinterable powdered resin that functions well over a wide range of temperatures, including room temperature, laser intensities and scan rates; and to provide a powder that is relatively insensitive to temperature variations in resin bed temperature if it is desired to sinter the powder from a bed that is maintained at some temperature above the ambient temperature.

It is also an object of the present invention to provide a powdered resin that is sinterable at low temperatures, but possesses physical properties similar to those of nylon and other powdered resins currently in use that require high resin bed operating temperatures.

SUMMARY OF THE INVENTION

The present invention provides a laser sinterable thermoplastic powder comprising a mixture of a powdered flow agent and at least one powdered block co-polymer thermoplastic resin having a Tg of not more than 50° C. The block co-polymer consists of a multiplicity of recurring intra-linear molecular units characterized as soft and hard segments. These segments joined head-to-tail to form the block co-polymer. The soft segment is selected from the group consisting of ether and ester molecular units, and the hard segment is selected from the group consisting of ester, amide and urethane molecular units. The weight ratio of hard to soft segments in the block co-polymer is from 0.7 to 20. The powdered resin has a particle size of from about 1 to about 200 microns.

The flow agent in the present composition is an inorganic powdered substance having a particle size of less than 10 microns selected from the group consisting of hydrated silicas, amorphous alumina, glassy silicas, glassy phosphates, glassy borates, glassy oxides, titania, talc, mica, fumed silicas, kaolin, attapulgite, calcium silicates, alumina and magnesium silicates. The flow agent is present only in an amount sufficient to cause the resin powder to flow and level.

The thermoplastic powder of the present invention may also contain nylon polymer.

The present invention also provides an improved method for forming a three dimensional article by laser sintering the powdered resin composition of this invention.

The method comprises the steps of:

(a) depositing a quantity of powdered resin on a support surface so that the powdered resin covers a target area;

(b) leveling the powdered resin to form a smooth surface;

(c) directing an energy beam over the target area causing the powder to form an integral layer; and (d) repeating steps (a) to (c) to form additional layers that are integrally bonded to adjacent layers so as to form a three dimensional article wherein the powdered resin comprises a mixture of a powdered flow agent and at least one powdered block co-polymer thermoplastic resin having a Tg of not more than 50° C. said block co-polymer consisting of a multiplicity of recurring intra-linear molecular units characterized as soft and hard segments, these segments joined head-to-tail to form the block co-polymer wherein the soft segment is selected from the group consisting of ether and ester molecular units and the hard segment is selected from the group consisting of ester, amide and urethane molecular units and wherein the weight ratio of hard to soft segments in the block co-polymer is from 0.7 to 20 and wherein the powdered resin has a particle size of from about 1 to about 200 microns.

The method of the present invention applies to the thermoplastic resin powders also containing nylon polymer.

DETAILED DESCRIPTION

The laser sinterable thermoplastic powder compositions of the present invention comprising a mixture of a powdered flow agent and at least one powdered block co-polymer thermoplastic resin having a Tg of not more than 50° C. The block co-polymer is a thermoplastic elastomer and is formed from molecular units characterized as soft and hard segments. These segments are bonded one to another by condensation polymerization such that the head of one segment is joined to the tail of another segment. Although these segments are bonded together at random, the weight ratio of hard to soft segments is from 0.7 to 20.

The soft segment may be either an ether or an ester; the hard segment may be an ester, amide or urethane. The segmented or block co-polymers of the present invention may be represented by the following combinations with the soft segment listed first: ether-ester, ester-ester, ether-amide, ester-amide, ether-urethane, ester-urethane or mixtures of these combinations.

The soft segments have the following structures: an ether (1) or an ester (2)

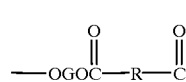

(1)

and

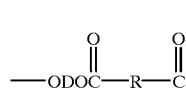

(2)

where R is a divalent radical remaining after removal of carboxyl groups from at least one dicarboxylic acid having a molecular weight of about 300;

where G is a divalent radical remaining after removal of terminal hydroxy groups from at least one long chain glycol having a molecule weight of about 400 to 6000; and where D is a divalent radical remaining after removal of terminal hydroxy groups from at least one long chain diol having a molecule weight of about 400 to 6000. Preferred diols from which the oligomers D and G are formed are those diols having a carbon chain of from 2 to 6 carbons.

The hard segments of the block co-polymers of the present invention may be represented by the following ester(3), amide(4) and urethane(5) structures:

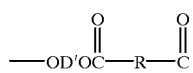

(3)

where R is a divalent radical described above; and where D' is a divalent radical remaining after removal of hydroxy groups from at least one low molecular weight diol having a molecular weight less than 250;

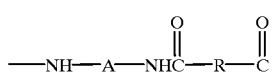

(4)

where R is a divalent radical described above; and where A is a divalent radical remaining after removal of amine groups from at least one low molecular weight diamine having a molecular weight less than 250; and

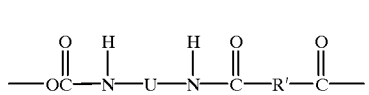

(5)

where R' is a residue remaining after addition of a diol to an isocyanate; and where U is a divalent radical remaining after removal of isocyanate groups from at least one low molecular weight diisocyanate having a molecular weight less than 500. A typical diisocyanate is 4,4'-diphenylmethane diisocyanate generally referred to as MDI.

Preferred diols used in forming R' are those diols having carbon chains from 2 to 6 carbon.

The segment or block that is generally referred to as the soft segment of the polymer provides elastomeric properties; while the segment or block that is referred to as the hard segment provides stiffness to the polymer.

Examples of the polymers which may be used in the present invention and methods for making these polymers are described in U.S. Pat. Nos. 3,561,014; 3,763,109; 3,766,146; 4,205,158; 4,544,734; 4,556,688; 3,784,520 and 3,044,987 and Federal Republic of Germany Patent No. 2 227 143.

Examples of polymers that may be used in the present invention include those sold under the Trademarks HYTREL (E.I. duPont), ARNITEL (Dutch State Mines), PEBAX (Atochem) and ESTANE (B.F. Goodrich), ESTAMID (Upjohn) and TEXIN (Mobay). HYTREL, for example, is a polyether-ester elastomer; ARNITEL is, for example, a polyester-ester elastomer; PEBAX is, for example, a polyether-amide elastomer; ESTANE is, for example, a polyether-urethane elastomer; ESTAMID is, for example, a polyester-amide; and TEXIN is, for example, a polyester-urethane.

A sinterable powdered resin of the present invention may be made of a single block co-polymer or a mixture of these block co-polymers. The block co-polymers used in the present invention range in Tg from about −80 to about 50° C. It is possible to achieve various properties of the laser sintered part or to enhance various properties such as stiffness by using a blend of these block co-polymers.

The sinterable resin mixture of the present invention may also contain nylon polymer. By the term nylon is meant amide polymers having melting points in excess of 110° C. For example, nylon polymer includes such commercial polymers as nylon 6, nylon 66, nylon 11, nylon 610 and mixtures of these polymers. Mixtures of nylon polymer means both mixtures of polymer made by combining separate powdered polymer, such as a mixture of nylon 6 and nylon 11 powders, and mixtures of polymer formed via co-polymerization, for example terpolymer formed from polymerization of the components of nylon 6, nylon 66 and nylon 610. The nylon polymer content of the sinterable powder of the present invention may be from 0 to 90% by weight of the resin powder. It is of great interest that the resin powder mixture of the present invention which includes nylon polymer can be formed into parts having properties similar to nylon polymer parts, but are sinterable at much lower temperatures than are required to sinter nylon polymer or nylon polymer compositions known heretofore. Typically nylon polymer beds must be maintained at temperatures of 170 to 190° C. to provide adequate sintering performance. Such high temperatures are difficult to maintain, and failure to provide adequate temperature control in the sintering bed may result in poor part formation, parts having less than desirable physical properties and losses due to parts failing to meet specifications. The present invention offers a resin powder composition and a method to process this composition that provides the nylon-like parts that may be produced under easily controlled temperature conditions.

Other compatible particles may also be blended into the sinterable powders of the present invention. Such particles include organic and inorganic materials such as fillers and pigments. It is not necessary that any of the other particles (polymers, monomers or fillers) have Tg's or melting points that are in the range of the block co-polymer powders, but it is necessary that the particles be compatible with the block co-polymers of the invention since the mixture of particles must form an integrally bonded part having strength sufficient for its use.

By using polymers or combinations of polymers of varying stiffness along with inorganic or organic fillers, one may formulate powdered resins according to the present invention that provide the physical properties of commercially available sinterable resin powders such as nylon. The use of the thermoplastic powdered resin having a Tg of less than 50° C. ensures that the processing temperature for these various mixtures will be lower than those used in laser sintering of the commercial powder available currently.

In addition to the use of various fillers in the formulation of the powders of the present invention, the formulations may contain pigments to produce parts of the desired colors. Of course, any pigment selected need retain color stability on exposure to the laser selected to sinter the powder or at the conditions of the sintering process.

The powders of the present invention are sinterable at low temperatures and also offer excellent thermal stability at sintering temperatures. Unlike nylon, for example which must be maintained at a bed temperatures of about 170 to 190° C. where there is real risk of thermal degradation of the polymer, the powders of the present invention may be sintered from room temperature up to temperatures of less than 150° C. and preferable at temperatures less than 125° C. At these lower temperatures there is no need to use low-oxygen or oxygen-free nitrogen to blanket the resin bed to prevent polymer thermal degradation.

The elastomeric resins of the present invention require cryogenic grinding to convert polymer pellets into the powdered resin of the invention. It is also recommended that when other resins, such as nylon, are incorporated into the resin powder of the present invention, that these resins, too, be cryogenically ground. The polymer pellets are first cooled using liquid nitrogen or some other refrigeration process so that the resins are below their Tg and thus, may be fractured by grinding. Although it is only necessary to lower the temperature of the block co-polymer below its Tg, grinding is more efficient if the particles are cooled as much as possible so that they become more brittle and fracture more easily.

The preferred means of grinding the block co-polymers to form the sinterable powder of the present invention is to use high shear grinding equipment such as an attrition or a pin mill. These mills have closely placed, high spinning plates that provide a grinding region of very high shear that fractures the cooled elastomeric particles.

The grinding process may be set up as a continuous process, and the particle size of the powdered resin selected by the use of sizing screens. Particles that are larger than the desired powder particle size may be returned to the grinding equipment for additional fracturing. By the use of screens particle size distribution may be closely controlled although the powder functions well over a wide range of particle size distributions to yield highly densified parts. Particles used may be those selected by particular screen sizes used in the grinding process, or may include a mixture of screened portions of the product following the grinding. The preferred particle size range is from 15 to 200 microns with a particle size distribution having a d50 of 100 microns being preferred. The term d50 of 100 microns means that 50% of the particles are smaller than 100 microns and 50% are larger than 100 microns.

In addition to the powdered block co-polymer resin, the composition of the present invention includes a flow agent. The flow agent is necessary so that the powdered resin will flow into the target area and be easily leveled before exposure by the laser. The flow agent should be added only in the amount sufficient to provide good flow and leveling to the powdered resin. Flow agents that may be used include inorganic powders having a particle size of not more than 10 microns. Typical flow agents include hydrated silicas, amorphous alumina, glassy silicas, glassy phosphates, glassy borates, glassy oxides, titania, talc, mica, fumed silicas, kaolin, attapulgite, calcium silicates, alumina and magnesium silicates. The amount of flow agent may vary with the nature and particle size of the particular flow agent selected and the block co-polymer with which it is blended.

The flow agent is blended with the powdered resin by low shear mixing; for example a ribbon mixer or v-mill provide the proper shear range for mixing the flow agent with the powdered resin. The flow agent may also be mixed with the powdered resin by using a low speed roller.

It is critical that the amount of flow agent and the shear in mixing the flow agent with the particles of powdered resin not alter in any way the Tg of the powdered resin. The concentration of flow agent in the composition is preferred to be between 0.02% and 5.0% by weight of the mixture. Higher concentrations of the flow agent tend to inhibit the flexibility of the sintered article, but more importantly, higher concentrations of the flow agent interfere with the sintering process.

The flow agents and the powdered resin need to be dry. Also excess mixing may introduce static electricity into the blend and decrease the powders ability to flow and level properly for use in laser sintering applications. It is preferred to mix the powdered resin with the flow agent no more than about 30 minutes. The particles of the polymer and the flow agent need be separate, free-flowing particles for good flow and leveling of the laser sinterable powder. Over mixing may embed the particles of the flow agent into the particles of the polymer resulting in poor flow and leveling of the mixture.

The sinterable powders of the present invention are elastomeric and are distinguishable over the powders of the prior art in their properties, sintering behavior and behavior in mixtures with flow agents. The elastomeric block co-polymers of the present invention have low Tg's ranging from −80° to temperatures well below the boiling point of water. Each block co-polymer has only one Tg. It is indeed surprising that such powdered polymers would function well and provide accurately formed laser sintered parts in view of the teaching and practice of this art.

The powdered resins of the present invention may be sintered by means known in the art using infrared radiation-emitting lasers. These powders may be sintered from beds of resin in the target area that are maintained at room or ambient temperature. The beds need not be heated for proper formation of the sintered article, neither must a part or article formed from the powdered resins of the present invention be cooled slowly while still in the heated resin bed or subjected to a cool down step before they are removed from the resin bed. Parts formed from sintering the powdered resins of the present invention may be removed immediately following formation from the resin bed. Cycle time in the laser sintering process using the resins of the present invention is dramatically reduced.

If desired, the powdered resin of the present invention may be sintered from a heated bed. In this case temperatures of the bed may be maintained at a lower settings than are currently practiced in this art. Parts formed from the powders of the present invention are not subject to the variations in quality, resolution or distortion, due to variations in bed temperature as are parts formed from the conventional resin powders used in selective laser sintering processes.

The Examples provided below are intended to illustrate the present invention without limiting the invention.

EXAMPLES

Example 1

HYTREL 4056, a polyether-ester elastomer, available from E.I. du Pont de Nemours, Inc. of Wilmington, Del., as quarter inch (0.635 cm) diameter, cylindrical pellets, was milled under liquid nitrogen in an attrition mill and screened to a particle size distribution of the fractured resin having a d50 of 100 microns. Cryogenic milling was required to ensure efficient particle fracturing.

A 50 gram sample of the ground HYTREL was placed in a glass jar with 0.4 grams (0.8% by weight) of Cab-o-sil, PS 530, fumed silica (flow agent), available from Cabot Corporation, Inc., of Tuscola, Ill. 61953. This mixture was blended by rolling the jar on a laboratory roller for 30 minutes at a low speed.

This mixture of powdered polymer and flow agent was applied to the target area of a selective laser sintering machine. The target area and the powdered polymer were at room temperature, approximately 23° C. The layer of polymer powder ranged in thickness from 100 to 200 microns.

Once the powder layer was leveled to form a smooth surface, it was exposed to radiation from a 50 watt carbon dioxide laser. The laser was controlled by computer such that the laser beam movement was controlled to scan an area of approximately 1 square inch or about 6.45 square centimeters. The energy of the laser was constant at 50 watts, but the intensity of the exposure was controlled by varying the scan rate from between 1 m/sec to 2 m/sec. Before each pass of the laser, a layer of powdered polymer was deposited over the target area so that the new layer of powder was about 150 microns. The laser line spacing was 0.20 mm. Each pass of the laser caused the polymer powder fused to produce a solid film. With successive passes of the laser beam, the film fused to the film formed on the previous pass. After 10 such passes, a rectangular solid article was formed having a thickness of about 0.15 cm and faces of 6.45 cm². The article was very flexible and could be easily deformed by pressure applied by hand. Once the hand pressure was relaxed, the article readily returned to its original shape.

The article thus formed was removed immediately from the target area with no cool down period. Any residual powdered polymer which was clinging to the surface of the article was removed by shaking the part or brushing its surface. The sinterable powder was fused into articles using a wide range of laser intensities, and in all cases the articles had good physical integrity and could not be divided into separate layers by pulling or other types of deformations with force applied directly by hand.

Example 2

The same laser sintering process was done as described in Example 1, except the HYTREL 4056 polymer was ground to provide a particle size distribution of 100 to 120 microns (d50). The article formed was again flexible and strong, but the larger particle size of the powder formed an article having a more course surface.

Example 3

The powder of Example 1 was sintered under the conditions of Example 1, except an article having 36 layers (about 0.54 cm in thickness) was formed. Again this article was formed at room temperature and was removed immediately from the target area with no time allowed for cool down. The article was strong and flexible.

Example 4

The conditions of Example 1 were repeated with the exception that the temperature of the bed of powdered resin in the target area was maintained at 50, 75, 100 and 125° C. Parts prepared under these conditions were very flexible and were removed from the bed of powdered resin immediately after sintering with no waiting period for cool down of the part. As the temperature of the bed was increased, the density of the part formed was increased. At the higher temperatures in the range listed, the parts showed slight deformation.

Example 5

The conditions and temperatures described in Example 4 were used to run HYTREL 8209. Parts prepared under these conditions have similar properties to those observed for HYTREL 4056.

Example 6

The following materials were tested according to the conditions in Example 1. The number of passes of the laser beam were from 10 to 36. A listing of the thermoplastic polyether-ester elastomers is shown below with the noted observation of flexibility.

Polymer Flexibility
  HYTREL* 3078 high flexible
  HYTREL G3548W high flexible
  HYTREL 8238 low flexible
  HYTREL G5544 medium flexible
  HYTREL 8206 medium flexible

Example 7

Mixtures of the HYTREL polymers were made by blending ground polymers under low shear. Each polymer was ground separately. The polymer powders were then combined to provide parts having desired properties. HYTREL 4065 powder was blended with HYTREL 8206 powder and a flow agent. Parts formed had medium flexibility.

Example 8

A part having a black color was made by processing the following mixture as described in Example 1: 12.5% by weight of a combination of 75% HYTREL 4056 and 25% carbon black mixed with HYTREL 4056 powder, which constituted the remaining 87.5% of this mixture.

Example 9

HYTREL 4056 containing 10% hollow glass beads (available from Potters Co. of Valley Forge, Pa. as spherical 110P8) was processed under the conditions described in Example 1 except that the laser was passed over the target 36 times. After the last pass by the laser, the part formed was immediately removed from the resin bed with no cool down time. A strong part was formed having low flexibility.

Example 10

Samples of the following powders were made from block co-polymers listed below and were processed according to Example 1. The number of passes of the laser were from 10 to 36. After the last pass of the laser, the parts formed were immediately removed from the resin bed with no cool down time. The flexibility is tested and the results are as listed:
  ARNITEL medium flexibility
  PEBAX medium flexibility
  ESTANE high flexibility

Example 11

ELVAMIDE 8061, a polyamide terpolymer of nylon 6, nylon 66, and nylon 610, a product on the E.I. DuPont de Nemours, Inc., of Wilmington, Del., as quarter inch (0.635 cm) diameter, cylindrical pellets, was milled under liquid nitrogen in an attrition mill and screened to a particle size distribution of the fractured resin having a d50 of 100 microns. Cryogenic milling was required to ensure efficient particle fracturing.

A 50 gram sample of this ELVAMIDE 8061 was mixed with a 50 gram samples of HYTREL 4056, as described in Example 1. These were then mixed with 0.8 grams (so that 0.8% by weight was present in the resin mixture) of Cab-o-sil, PS 530, fumed silica (flow agent), available from Cabot Corporation, Inc., of Tuscola, Ill. 61935. This mixture was blended by rolling the jar on a laboratory roller for 30 minutes, at a low speed.

The mixture of powdered polymers and flow agent was applied to the target area of a selective laser sintering machine. The target area and the powder mixture were a 100° C. The layer of polymer powder ranged in thickness from 100 to 200 microns. The powder was exposed to form sintered parts as described in Example 1.

Parts prepared from this mixture were similar to those prepared from nylon alone, being less flexible, having a harder surface and being stiffer than parts made from HYTREL 4056. These parts can be prepared at 100° C. vs. temperatures of 170 to 190° C., which are required for nylons such as nylon 11.

Example 12

Parts were prepared as described in Example 11, at temperatures of 105, 110, 115, 120, 125, and 130° C. All the parts made had nylon like properties but were fabricated at lower temperatures.

Example 13

Parts were prepared as described in Example 11, using two mixtures of ELVAMIDE 8061 and HYTREL 4056 in which the ELVAMIDE 8061 was 75% and 87.5% of the mixtures and the HYTREL 4056 was 25% and 12.5% weight percent of the mixtures, respectively. Parts were successfully prepared having nylon like properties at these lower temperature normally used for processing HYTRELs.

Example 14

Parts were prepared as described in Example 11 using HYTREL 8206 and ELVAMIDE 8061 in a 50:50 ratio at 130° C. This yielded parts with nylon like properties.

Example 15

Parts were prepared as described in Example 11 using nylon 11, a polyamide product of Elf Atochem (Elf Atochem North America, Inc., Polymer Division, located in Birdsboro, Pa.) and HYTREL 4056 in a 50:50 ratio, at 120° C. This mixture gave parts having nylon like properties.

What is claimed is:

1. A method of forming an article comprising laser sintering a laser sinterable thermoplastic powder comprising a mixture of a powdered flow agent and at least one powdered block co-polymer thermoplastic resin having a Tg of not more than 50° C., said block co-polymer consisting of a multiplicity of recurring intra-linear molecular units characterized as soft and hard segments, these segments joined head-to-tail to form the block co-polymer wherein the soft segment is selected from the group consisting of ether and ester molecular units and wherein the weight ratio of hard to soft segments in the block co-polymer is from 0.7 to 20 and wherein the powdered resin has a particle size of from about 1 to about 200 microns.

2. The method of claim 1 wherein the flow agent is an inorganic powdered substance having a particle size of less than 10 microns selected from the group consisting of hydrated silicas, amorphous alumina, glassy silicas, glassy phosphates, glassy borates, glassy oxides, titania, talc, mica, fumed silicas, kaolin, attapulgite, calcium silicates, alumina and magnesium silicates.

3. The method of claims 1 or 2 wherein the block co-polymer resin is selected from the group consisting of polyether-ester elastomers, polyester-ester elastomers, polyether-amide elastomers, polyether-urethane elastomers, polyester-amides, polyester-urethanes and mixtures of these resins.

4. The method of claim 1 wherein the block co-polymer resin is a polyether-ester elastomer and the flow agent in fumed silica.

5. The method of claim 1 wherein the thermoplastic powder further comprises a nylon polymer.

6. The method of claim 5 wherein the block co-polymer resin is a polyether-ester elastomer, the flow agent is fumed silica, and the nylon polymer is selected from the group consisting of nylon 6, nylon 66, nylon 11, nylon 610 and mixtures of these polymers.

7. The method of claim 5 wherein the block co-polymer resin is a polyether-ester elastomer, the flow agent is fumed silica, and the nylon polymer is selected from the group consisting of terpolymers of nylon 6, nylon 66, nylon 610.

8. A method for forming a three dimensional article by laser sintering comprising the steps of:

(a) depositing a quantity of powdered resin on a support surface so that the powdered resin covers a target area;

(b) leveling the powdered resin to form a smooth surface;

(c) directing an energy beam over the target area causing the powder to form an integral layer; and (d) repeating steps (a) to (c) to form additional layers that are integrally bonded to adjacent layers so as to form a three dimensional article, wherein powdered resin comprises a mixture of a powdered flow agent and at least one powdered block co-polymer thermoplastic resin having a Tg of not more than 50° C. said block co-polymer consisting of a multiplicity of recurring intra-linear molecular units characterized as soft and hard segments, these segments joined head-to-tail to form the block co-polymer wherein the soft segment is selected from the group consisting of ether and ester molecular units and the hard segment is selected from the group consisting of ester, amide and urethane molecular units and wherein the weight ratio of hard to soft segments in the block co-polymer is from 0.7 to 20 and wherein the powdered resin has a particle size of from about 1 to about 200 microns.

9. The method of claim 8 wherein the flow agent is an inorganic powdered substance having a particle size of less than 10 microns selected from the group consisting of hydrated silicas, amorphous alumina, glassy silicas, glassy phosphates, glassy borates, glassy oxides, titania, talc, mica, fumed silicas, kaolin, attapulgite, calcium silicates, alumina and magnesium silicates.

10. The method of claims 8 or 9 wherein the block co-polymer resin is selected from the group consisting of polyether-ester elastomers, polyester-ester elastomers, polyether-amide elastomers, polyether-urethane elastomers, polyester-amides, polyester-urethanes and mixtures of these resins.

11. The method of claim 8 wherein the block co-polymer resin is a polyether-ester elastomer and the flow agent is fumed silica.

12. The method of claim 8 wherein the thermoplastic powder further comprises a nylon polymer.

13. The method of claim 12 wherein the block co-polymer resin is a polyether-ester elastomer, the flow agent in fumed silica, and the nylon polymer is selected from the group consisting of nylon 6, nylon 66, nylon 11, nylon 610 and mixtures of these polymers.

14. The method of claim 12 wherein the block co-polymer resin is a polyether-ester elastomer, the flow agent is fumed silica, and the nylon polymer is selected from the group consisting of terpolymers of nylon 6, nylon 66, nylon 610.

15. A method of forming an article comprising laser sintering a powder mixture comprising:

(a) a powdered flow agent; and (b) at least one powdered block co-polymer thermoplastic resin having a Tg of not more than 50° C., wherein the powder mixture is laser sinterable.

* * * * *